(12) United States Patent
Chapple et al.

(10) Patent No.: US 6,950,887 B2
(45) Date of Patent: Sep. 27, 2005

(54) METHOD AND APPARATUS FOR GATHERING QUEUE PERFORMANCE DATA

(75) Inventors: James S. Chapple, Chandler, AZ (US); Kalpesh D. Mehta, Chandler, AZ (US); Frank T. Hady, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 136 days.

(21) Appl. No.: 09/848,998

(22) Filed: May 4, 2001

(65) Prior Publication Data

US 2002/0172319 A1 Nov. 21, 2002

(51) Int. Cl.[7] ................................................. G06F 3/00
(52) U.S. Cl. .................... 710/55; 710/23; 710/39; 710/52; 711/156; 370/232; 370/413
(58) Field of Search ........................... 710/23, 39, 52, 710/55; 711/156; 370/232, 413

(56) References Cited

U.S. PATENT DOCUMENTS

| | | | | |
|---|---|---|---|---|
| 5,450,546 A | * | 9/1995 | Krakirian | 710/57 |
| 5,469,398 A | * | 11/1995 | Scott et al. | 365/221 |
| 5,797,019 A | | 8/1998 | Levine et al. | |
| 5,805,883 A | * | 9/1998 | Saitoh | 718/105 |
| 5,835,702 A | | 11/1998 | Levine et al. | |
| 6,092,126 A | * | 7/2000 | Rossum | 710/52 |
| 6,134,218 A | * | 10/2000 | Holden | 370/232 |
| 6,401,149 B1 | * | 6/2002 | Dennin et al. | 710/58 |
| 6,449,666 B2 | * | 9/2002 | Noeldner et al. | 710/23 |
| 6,480,942 B1 | * | 11/2002 | Hirairi | 711/156 |
| 6,487,212 B1 | * | 11/2002 | Erimli et al. | 370/413 |
| 6,501,757 B1 | * | 12/2002 | Kamaraj et al. | 370/395.41 |
| 6,556,572 B1 | * | 4/2003 | Ishida | 370/395.41 |

FOREIGN PATENT DOCUMENTS

| | | |
|---|---|---|
| EP | 0 768 600 A1 | 4/1997 |
| JP | 62279438 | 12/1987 |

OTHER PUBLICATIONS

Author: William Ford & William Topp, Title: "Data Structures with C++", Date: 1996, Publisher: Prentice Hall, Pertinent pp: 204–208.*

PCT International Search Report for PCT/US 02/14013, mailed Sep. 27, 2002.

* cited by examiner

Primary Examiner—Jeffrey Gaffin
Assistant Examiner—Niketa Patel
(74) Attorney, Agent, or Firm—Blakely, Sokoloff, Taylor & Zafman LLP

(57) ABSTRACT

An apparatus for gathering queue performance data includes an event conditioning logic unit that receives a queue enter signal, a queue exit signal, and a queue not empty signal from a queue. The apparatus also includes a counter that may be both incremented and decremented. The event conditioning logic unit may be programmed to increment the counter upon occurrences of a predetermined combination of the queue signals. The event conditioning logic unit may also be programmed to decrement the counter upon occurrences of an additional predetermined combination of the queue signals.

22 Claims, 7 Drawing Sheets

METHOD AND APPARATUS FOR GATHERING QUEUE PERFORMANCE DATA

FIELD OF THE INVENTION

The present invention pertains to the field of computer systems. More particularly, this invention pertains to the field of gathering queue performance data in computer system components.

BACKGROUND OF THE INVENTION

In order to accomplish computer system performance tuning, it is important to be able to characterize various aspects of the computer system's behavior. One such aspect is queue utilization and behavior. A queue is a temporary storage space for instructions or data. Queues may be located throughout a computer system and are typically included in processors and chipset devices.

Counters have been used in prior systems to collect data from physically inaccessible queues. The type of information that can be gathered by counters alone is limited to simple average metrics, such as throughput. Another measurement that can be made is the percentage of time that the queue is full. The amount of computer system performance tuning that can be performed with these simple metrics is limited. Therefore, an ability to collect more meaningful and useful data from queues is desirable.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

The example embodiments described below take advantage of several signals generated at a queue, including a queue enter signal, a queue exit signal, and a queue not empty signal. These signals, in addition to allowing counters to both increment and decrement, provide a greater range of measurement possibilities than previously available. Embodiments are possible using more than one counter.

Figure 1:
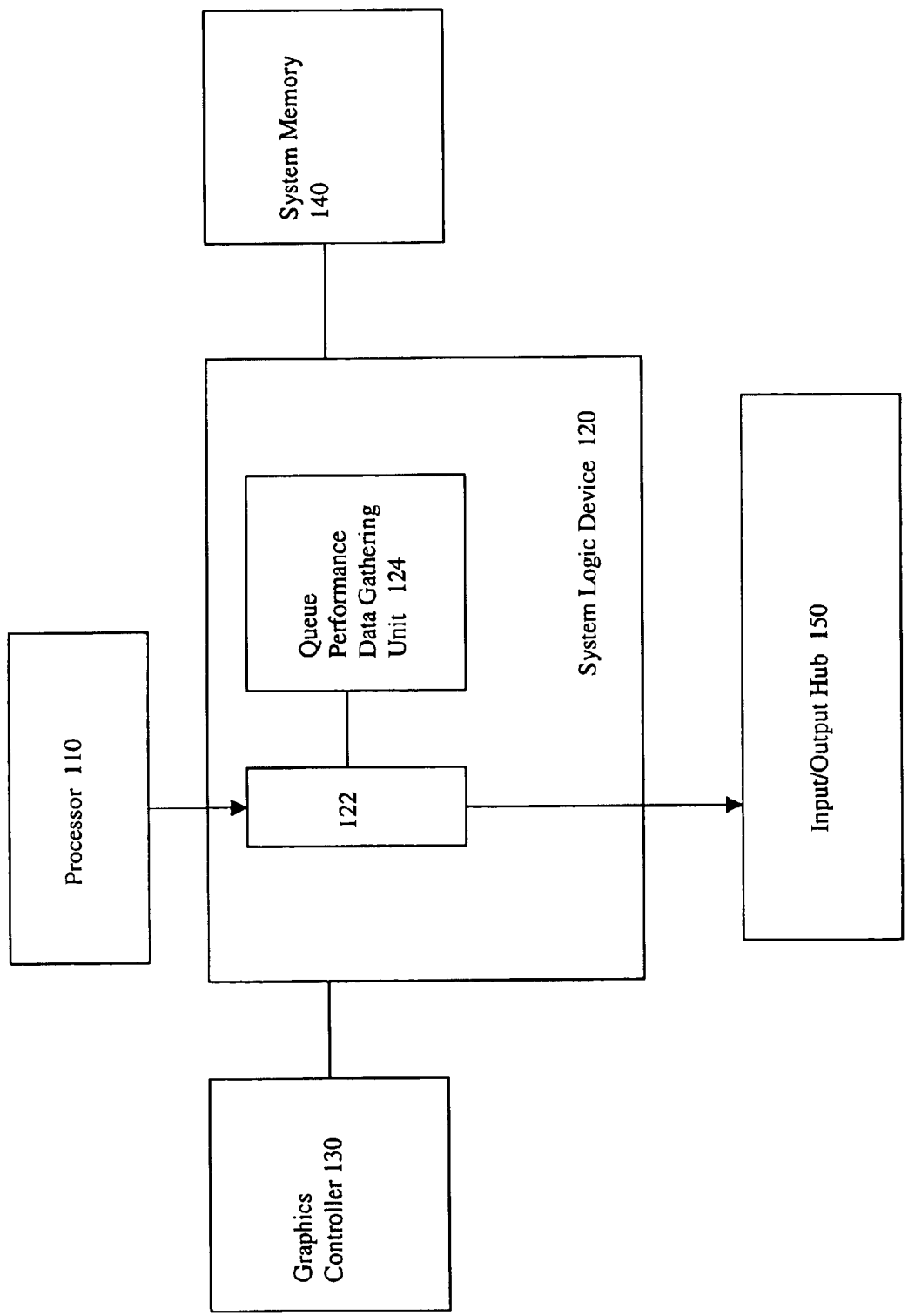
FIG. 1 is a block diagram of a computer system including a queue and a queue performance data gathering unit.

FIG. 1 is a block diagram of a computer system including a queue 122 and a queue performance data gathering unit 124. The queue 122 and the queue performance data gathering unit 124 are included in a system logic device 120. The system logic device 120 receives commands from a processor 110. The commands for this example embodiment are temporarily stored in the queue 122. The commands are later delivered to an input/output hub 150. Many other types of communication may take place among the processor 110, the system logic device 120, and the input/output hub 150. The system logic device 120 is further coupled to a graphics controller 130 and a system memory 140.

The queue performance data gathering unit 124 receives signals from the queue 122 and performs data gathering operations. Some of the possible data gathering operations are discussed below.

Although this example embodiment discusses a single queue between the processor 110 and the input/output hub 150, other embodiments are possible using many more queues between many more interfaces. The queue 122 is meant to demonstrate one of many possible queues that may be included in a computer system.

Figure 2:
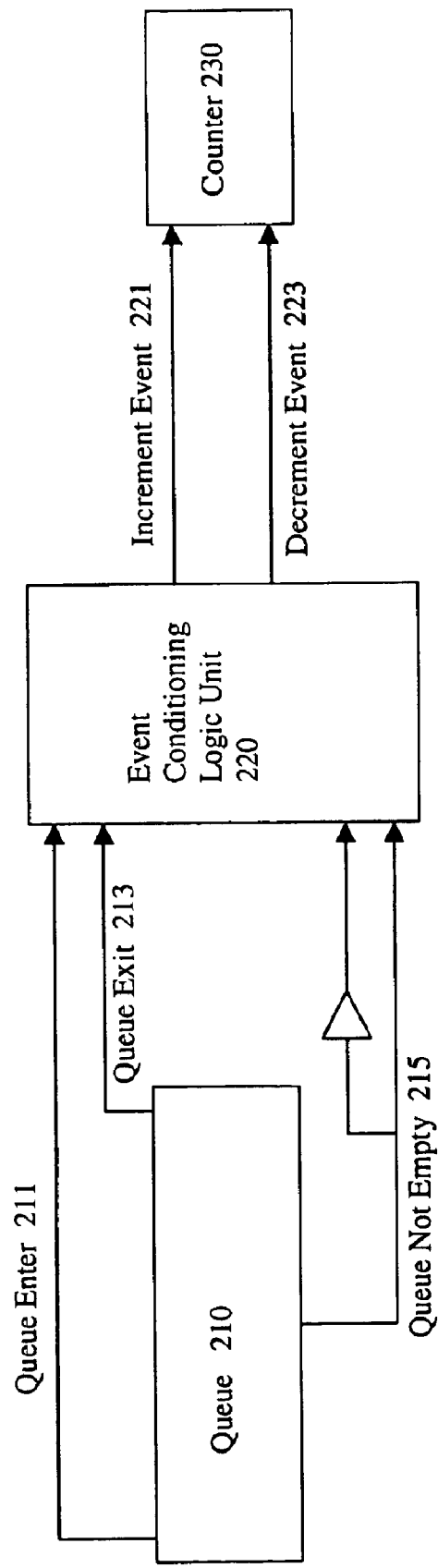
FIG. 2 is a block diagram of a queue coupled to an event conditioning logic unit which is in turn coupled to a counter.

FIG. 2 is a block diagram of a queue 210 coupled to an event conditioning logic unit 220 which is in turn coupled to a counter 230. The queue 210 provides a queue enter signal 211, a queue exit signal 213, and a queue not empty signal 215 to the event conditioning logic unit 220. An inverted version of the queue not empty signal 215 (effectively a queue empty signal) is also presented to the event conditioning logic unit 220. The queue enter signal 211 is asserted for a clock period whenever a new entry has entered the queue 210. The queue exit signal 213 is asserted for a clock period whenever an entry is discharged from the queue 210. The queue not empty signal is asserted whenever there is one or more entries in the queue 210.

The event conditioning logic unit 220 uses one or more of the signals from the queue 210 to generate an increment event signal 221 and a decrement event signal 223. The increment and decrement event signals 221 and 223 are coupled to a counter 230. The counter 230 increments in response to an assertion of the increment event signal 221 and decrements in response to an assertion of the decrement event signal 223.

The function of the event conditioning logic unit 220 may be programmable via software-visible registers. One possible function of the event conditioning logic 220 is to assert the increment event signal 221 whenever the queue enter signal is asserted and to assert the decrement event signal 223 whenever the queue exit signal 213 is asserted. If both the queue enter signal 211 and the queue exit signal 213 are both asserted, then the event conditioning logic does not assert the increment event signal 221 or the decrement event signal 223. By incrementing the counter 230 whenever a new entry enters the queue and by decrementing the counter 230 whenever an entry exits the queue, the counter will always contain a value that accurately represents the present fill level of the queue.

The event conditioning logic unit 220 may be programmed to perform other analysis tasks by using various combinations of the queue enter signal 211, the queue exit signal 213, the queue not empty signal 215, and the inverted version of the queue not empty signal 215 to trigger assertions of the increment event signal 221 and the decrement event signal 223.

Figure 3:
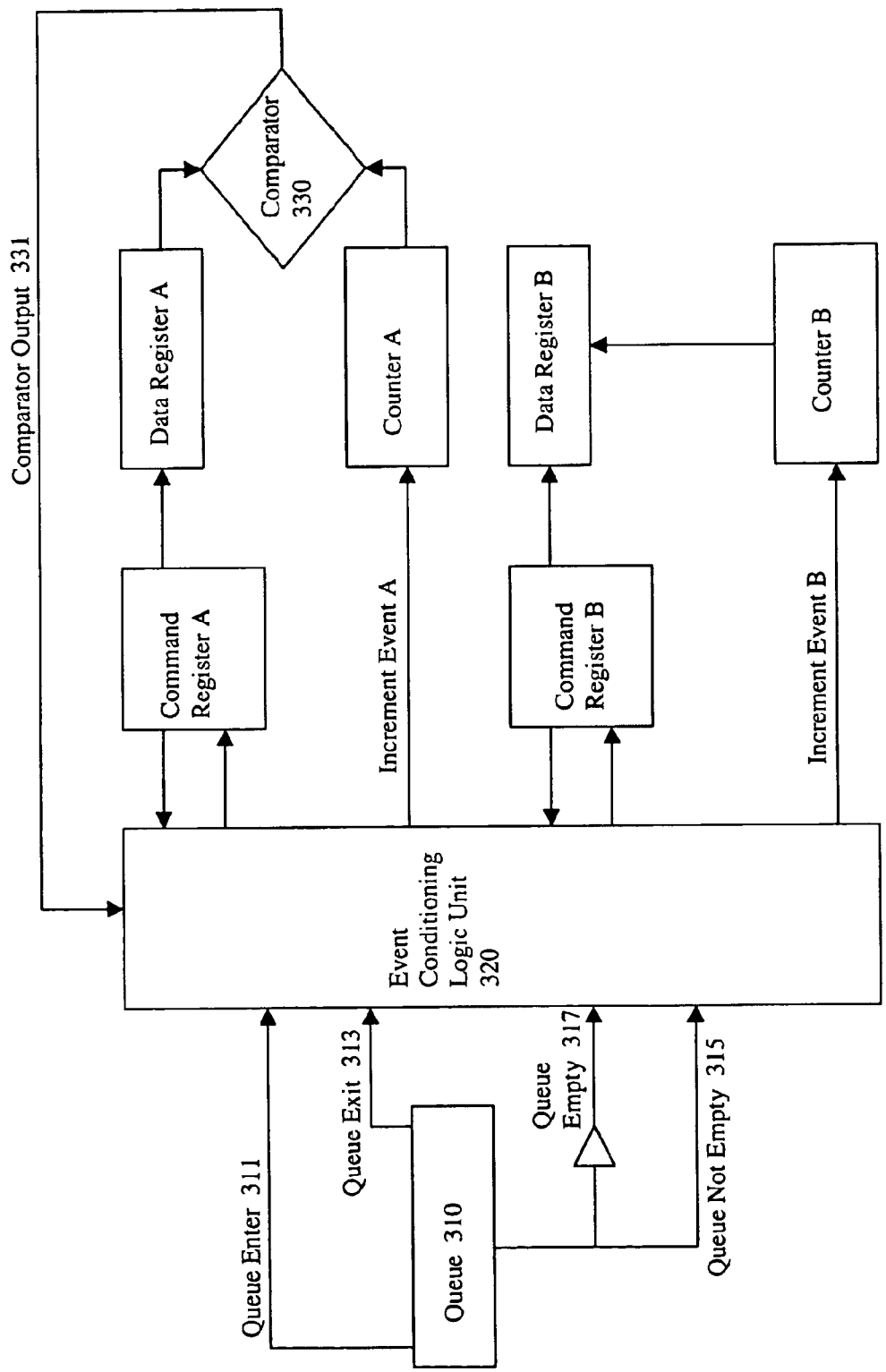
FIG. 3 is a block diagram of a queue performance data gathering unit that includes an event conditioning logic unit and two counters.

FIG. 3 is a block diagram of a queue performance data gathering unit that includes an event conditioning logic unit 320. This example embodiment is configured to perform head-of-queue measurements. Other configurations are possible to enable other types of queue analysis. The event conditioning logic unit 320 receives a queue enter signal 311, a queue exit signal 313, a queue not empty signal 315, and a queue empty signal 317 (an inverted version of the queue not empty signal 315) from a queue 310. The event conditioning logic unit 320 delivers an increment event A signal to a counter A and an increment event B signal to a counter B. The counter A delivers its value to one input of a comparator 330. The comparator 330 receives its other input from a data register A which is programmable and visible to software. The comparator output signal 331 in this example becomes asserted when the counter value matches the contents of the data register A. The comparator output 331 is presented to the event conditioning logic unit 320. Other embodiments are possible where the comparator 330 asserts its output when the comparator 330 detects that the counter A value is less than the data register A value and also where the comparator 330 detects that the counter A value is greater than the data register A value. The functionality of the comparator 330 may be programmable.

The queue performance data gathering unit of FIG. 3 further includes command register sets A and B which are each coupled to the event conditioning logic unit 320. The command registers A and B are also coupled to the data registers A and B, respectively.

For this example, a threshold level is written to the data register A. The event conditioning logic unit 320 is programmed to assert the increment event A signal whenever the queue not empty signal 315 is asserted. The event conditioning logic unit 320 is also programmed to assert the increment event B signal in response to an assertion of the comparator output signal 331. The counter A is reset whenever the queue exit signal 313 is asserted.

The head-of-queue measurement implemented in this example embodiment operates as follows. When there is an entry in the queue 310, the queue not empty signal 315 is asserted. The event conditioning logic unit 320 asserts the increment event A signal in response to the assertion of the queue not empty signal 315. The counter A is incremented in response to the assertion of the increment event A signal. The counter A continues to increment each clock period until the counter A is reset in response to an assertion of the queue exit signal 313.

During each clock period, the comparator 330 compares the counter A value with the threshold value stored in data register A. When the comparator 330 detects a match, the comparator output signal 331 is asserted resulting in an assertion of the increment event B signal. Counter B is incremented in response to the assertion of the increment event B signal. In this manner, the counter B tracks how many times during a workload run a queue entry remained at the head of the queue for at least the number of clock periods indicated by the threshold value stored in data register A. At the end of the workload run, the counter B value can be accessed by reading the data register B which latches in the counter B value.

The operation of the queue data gathering unit of FIG. 3 will be best understood by looking at several runs through a repeatable workload, as shown in the timing diagrams of FIGS. 4 through 7 below.

Figure 4:
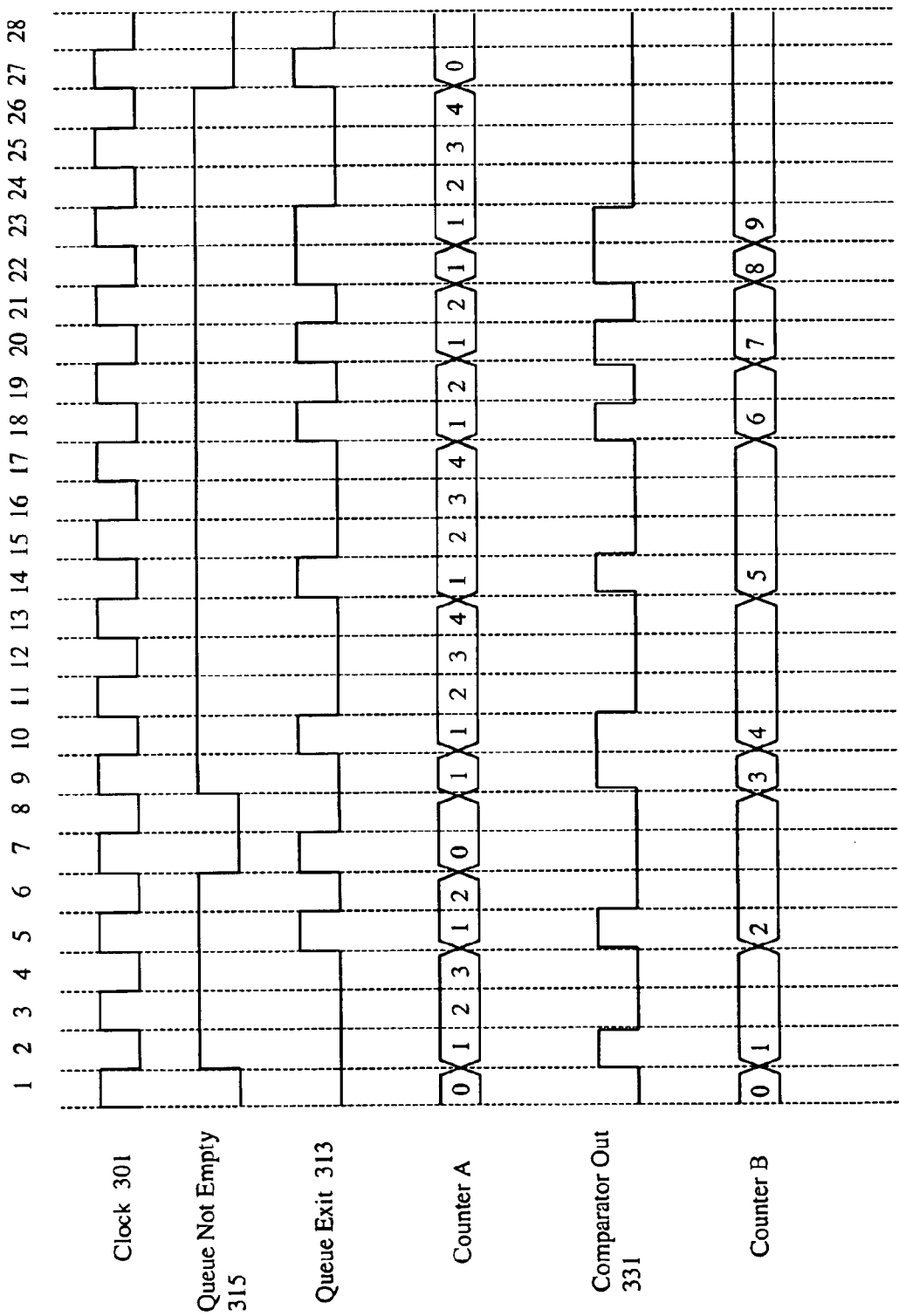
FIG. 4 is a timing diagram demonstrating one pass of a sample workload through the queue performance gathering unit of FIG. 3 set up to take head-of-queue measurements with a threshold value of one.

FIG. 4 is a timing diagram demonstrating one pass of a sample workload through the queue performance gathering unit of FIG. 3 with a threshold value of 1 stored in the data register A. During clock period 1, the queue not empty signal 315 and the queue exit signal 313 are not asserted, and the counters A and B are set to 0. Because the threshold level for this example is 1 and counter A contains 0, the comparator output signal 331 is not asserted.

During clock period 2, the queue not empty signal 315 becomes asserted and counter A is incremented. The counter A value now matches the threshold value and the comparator output signal 331 is accordingly asserted. The assertion of the comparator output signal 331 results in the incrementing of the counter B, which then contains 1.

During clock periods 3 and 4 the queue not empty signal 315 remains asserted and the queue exit signal 313 remains deasserted. Therefore, counter A continues to increment. The counter A values do not match the threshold value, so the counter B value remains at 1.

During clock period 5, the queue exit signal 313 becomes asserted while the queue not empty signal 315 remains asserted, indicating that there is a new entry at the head of the queue 320. The counter A is reset and incremented to the value 1. The counter A value then matches the threshold value stored in the data register A and the comparator output signal 331 becomes asserted by the comparator 330. The assertion of the comparator output signal 331 results in the incrementing of the counter B, which then contains the value 2.

During clock period 7, the queue exit signal 313 is again asserted, resulting in the counter A being reset to 0. The queue not empty signal 315 is also not asserted, so the counter A is not incremented. The queue not empty signal 315 becomes asserted again during clock period 9 and remains asserted until clock period 27. Therefore, during clock periods 9 through 26 the counter A is incremented once each clock period. The queue exit signal 313 is asserted during clock periods 10, 14, 18, 20, 22–23, and 27 resulting in the counter A being reset during those clock periods. The comparator output signal 331 becomes asserted during clock periods 9–10, 14, 18, 20, and 22–23. At the end of the workload run the counter B indicates that queue entries remained at the head of the queue greater than or equal to one clock period (the threshold value for this example) 9 times during the workload run.

By changing the threshold value and rerunning the same workload, a histogram of head-of-queue times can be established. The following figures follow the same workload as that discussed above in connection with FIG. 4.

Figure 5:
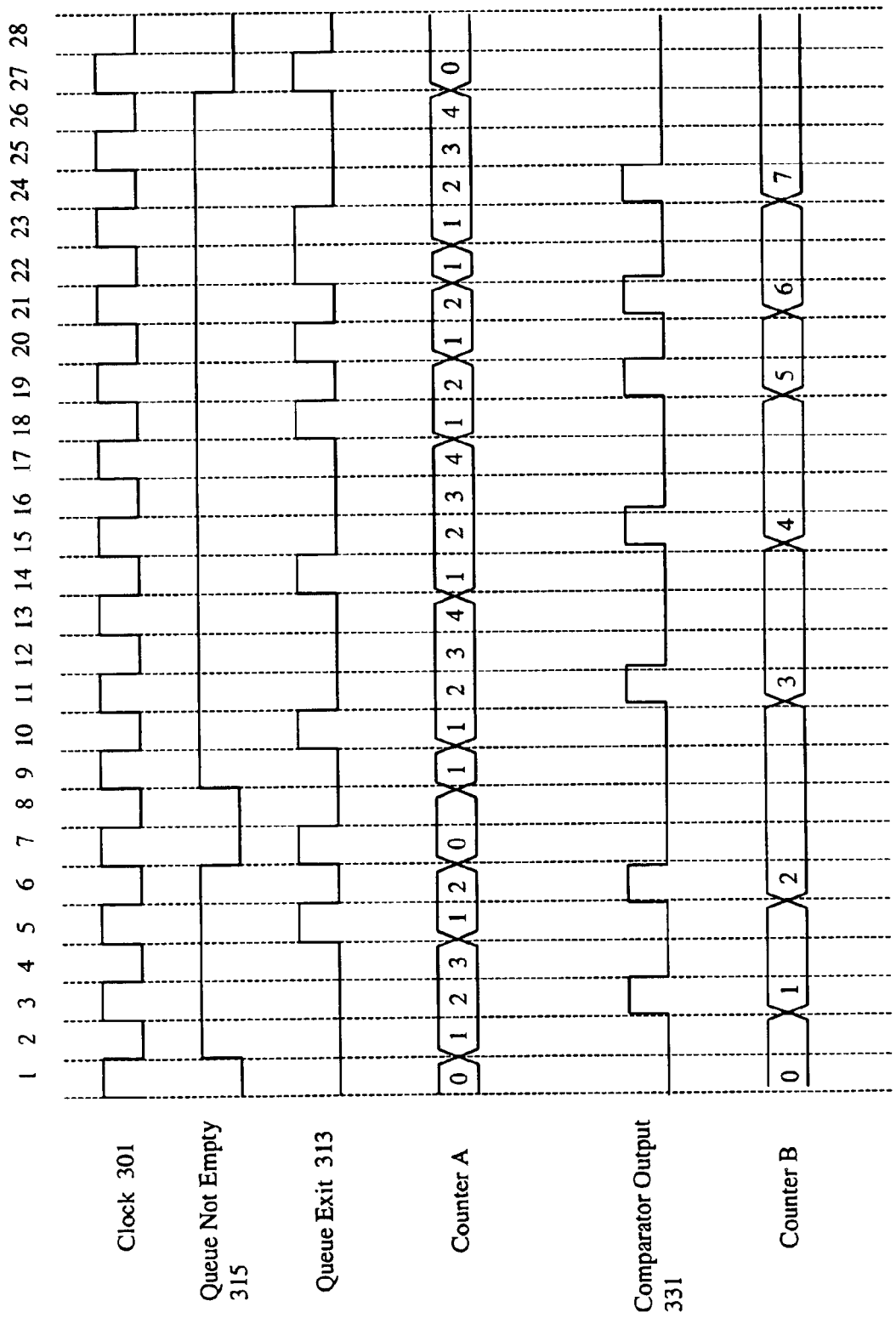
FIG. 5 is a timing diagram demonstrating one pass of a sample workload through the queue performance gathering unit of FIG. 3 set up to take head-of-queue measurements with a threshold value of two.

FIG. 5 is a timing diagram demonstrating one pass of the sample workload through the queue performance gathering unit of FIG. 3 with a threshold value of 2. Because the workload for this example is the same as that used for the example of FIG. 4, the queue not empty 315, queue exit 313, and Counter A waveforms of FIG. 5 are identical to those of FIG. 4. Because the threshold value is 2 for this example, the comparator output signal 331 becomes asserted when the Counter A value reaches 2. The Counter B value is incremented in response to the assertions of the comparator output signal 331. At the end of the workload run, the Counter B indicates that queue entries remained at the head of the queue greater than or equal to 2 clock periods (the threshold value for this example) 7 times during the workload run.

An additional piece of data can now be determined after the second workload run. It is now known that queue entries remained at the head of the queue for exactly one clock period a total of 2 times during the workload run. This can be determined by observing the facts that the first run with a threshold of 1 resulted in a counter B value of 9 and that the second run with a threshold of 2 resulted in a counter B value of 7. The difference between the counter B value for the first run and the counter B value for the second run gives the exact number of times that queue entries remained at the head of the queue for exactly one clock period (the threshold value for the first run).

Figure 6:
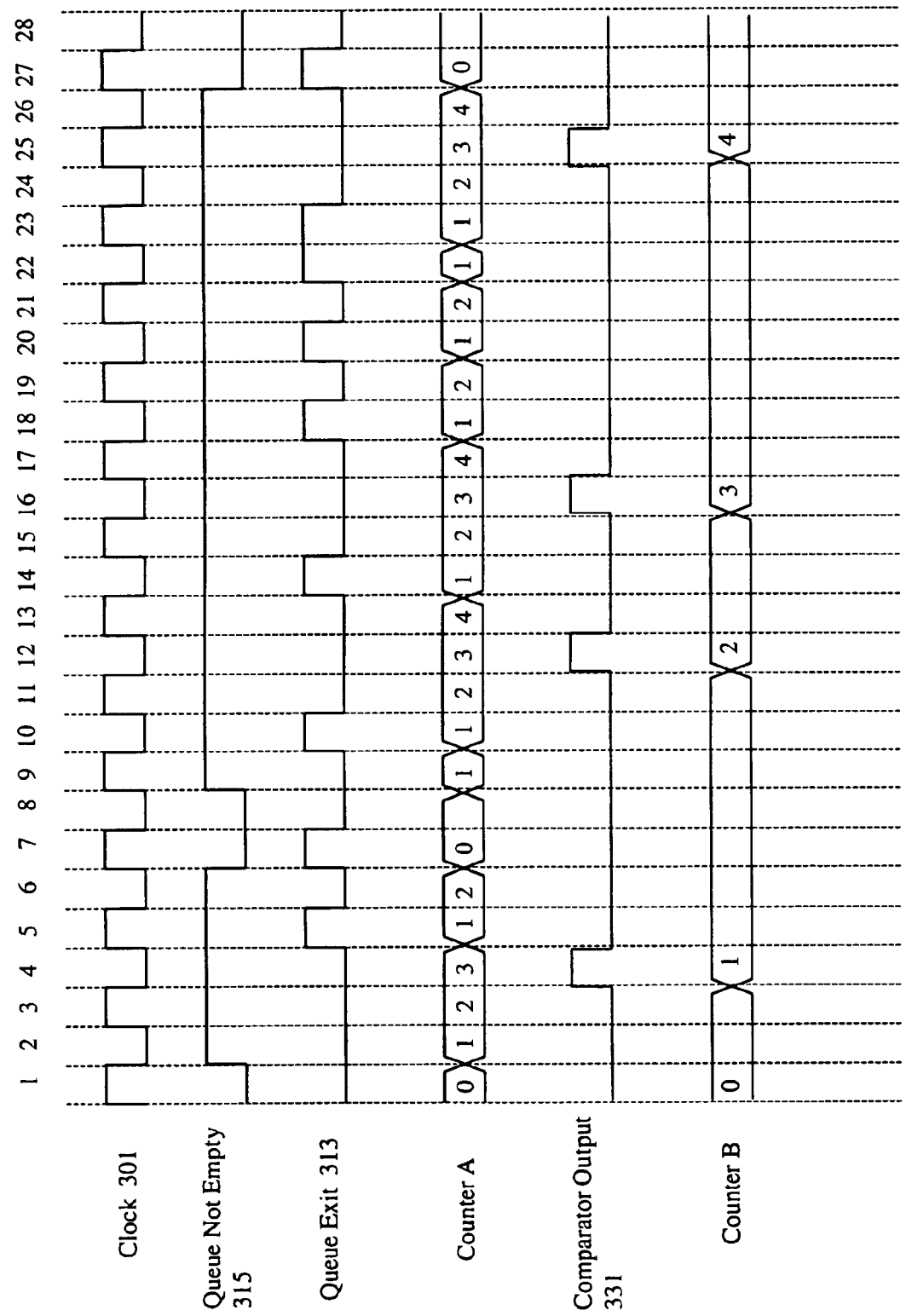
FIG. 6 is a timing diagram demonstrating one pass of a sample workload through the queue performance gathering unit of FIG. 3 set up to take head-of-queue measurements with a threshold value of three.

FIG. 6 is a timing diagram demonstrating one pass of the sample workload through the queue performance gathering unit of FIG. 3 with a threshold value of 3. Because the workload for this example is the same as that used for the examples of FIGS. 4 and 5, the queue not empty 315, queue exit 313, and Counter A waveforms of FIG. 6 are identical to those of FIGS. 4 and 5. Because the threshold value is 3 for this example, the comparator output signal 331 becomes asserted when the Counter A value reaches 3. The Counter B value is incremented in response to the assertions of the comparator output signal 331. At the end of the workload run, the Counter B indicates that queue entries remained at the head of the queue greater than or equal to 3 clock periods (the threshold value for this example) 4 times during the workload run.

A further piece of data can now be determined after the third workload run. It is now known that queue entries remained at the head of the queue for exactly 2 clock periods a total of 3 times during the workload run. This can be determined by observing the facts that the second run with a threshold value of 2 resulted in a counter B value of 7 and that the third run with a threshold value of 3 resulted in a counter B value of 4. The difference between the counter B value for the second run and the counter B value for the third run gives the exact number of times that queue entries remained at the head of the queue for exactly two clock periods (the threshold value for the second run).

Figure 7:
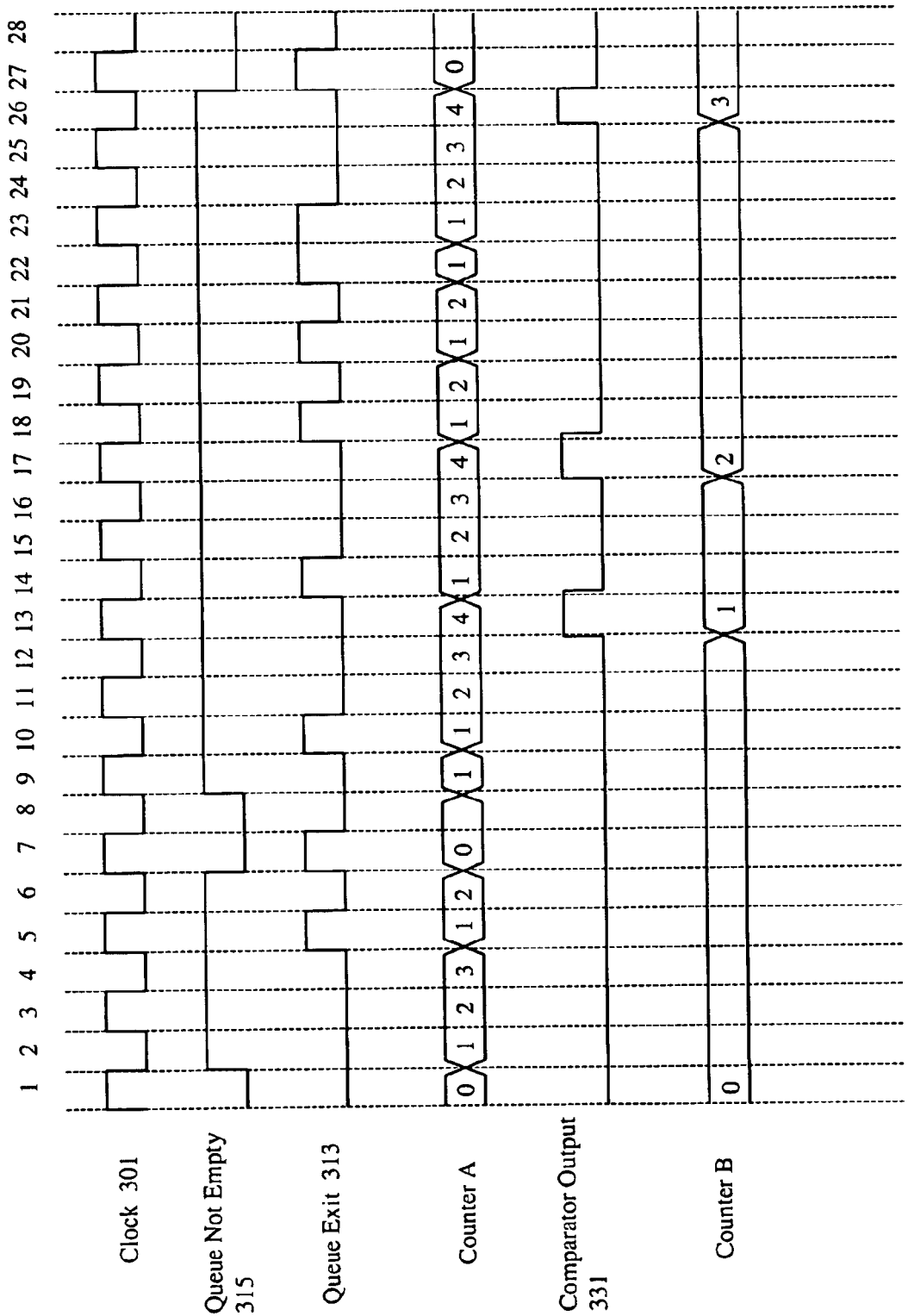
FIG. 7 is a timing diagram demonstrating one pass of a sample workload through the queue performance gathering unit of FIG. 3 set up to take head-of-queue measurements with a threshold value of four.

FIG. 7 is a timing diagram demonstrating one pass of the sample workload through the queue performance gathering unit of FIG. 3 with a threshold value of 4. Because the workload for this example is the same as that used for the examples of FIGS. 4, 5, and 6, the queue not empty 315, queue exit 313, and Counter A waveforms of FIG. 7 are identical to those of FIGS. 4, 5, and 6. Because the threshold value is 4 for this example, the comparator output signal 331 becomes asserted when the Counter A value reaches 4. The Counter B value is incremented in response to the assertions of the comparator output signal 331. At the end of the workload run, the Counter B indicates that queue entries remained at the head of the queue greater than or equal to 4 clock periods (the threshold value for this example) 3 times during the workload run.

An additional piece of data can now be determined after the fourth workload run. It is now known that queue entries remained at the head of the queue for exactly three clock periods a total of 1 time during the workload run. This can be determined by observing the facts that the third run with a threshold of 3 resulted in a counter B value of 4 and that the fourth run with a threshold of 4 resulted in a counter B value of 3. The difference between the counter B value for the third run and the counter B value for the fourth run gives the exact number of times that queue entries remained at the head of the queue for exactly three clock periods (the threshold value for the third run).

The present invention has been described with reference to specifec exemplary embodiments thereof. It will, however, be evident that various modifications and changes may be made thereto without departing from the broader spirot and scope of the invention as set forth in the appended claims. The specification and drawings are, according, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. An apparatus, comprising:
   a queue;
   a programmable event conditioning logic unit to receive a queue enter signal, a queue exit signal, and a queue not empty signal from the queue, the queue enter signal to be asserted in response to an entry entering the queue, the queue exit signal to be asserted in response to an entry exiting the queue, and the queue not empty signal to indicate that the queue contains at least one entry;
   a first counter to increment in response to a first increment event signal delivered by the event conditioning logic unit, the first counter to decrement in response to a first decrement event signal delivered by the event conditioning logic unit; and
   a second counter to increment in response to a second increment event signal delivered by the event conditioning logic unit, the second counter to decrement in response to a second decrement event signal delivered by the event conditioning logic unit,
   wherein assertion of at least one of the second increment event signal and the second decrement event signal is based on a value of the first counter.

2. The apparatus of claim 1, the event conditioning logic unit to further receive an inverted version of the queue not empty signal.

3. The apparatus of claim 2, further comprising a data register coupled to the first counter.

4. The apparatus of claim 3, further comprising a comparator including a first input, a second input, and an output, the first input coupled to the data register, the second input coupled to the first counter, and the output provided to the event conditioning logic unit.

5. The apparatus of claim 4, the event conditioning logic including programmable functions to allow a variety of combinations of the queue enter, queue exit, queue not empty, queue empty, and comparator output signals to serve as increment or decrement events.

6. The apparatus of claim 5, further comprising a block of registers including a command register and a status register.

7. An apparatus, comprising:
   a queue;
   a programmable event conditioning logic unit to receive a queue enter signal, a queue exit signal, and a queue not empty signal from the queue, the queue enter signal to be asserted in response to an entry entering the queue, the queue exit signal to be asserted in response to an entry exiting the queue, and the queue not empty signal to indicate that the queue contains at least one entry; and
   a first counter to increment in response to a first increment event signal delivered by the event conditioning logic unit, the first counter to decrement in response to a first decrement event signal delivered by the event conditioning logic unit;

a data register coupled to the first counter;

a comparator including a first input, a second input, and an output, the first input coupled to the data register, the second input coupled to the first counter, and the output provided to the event conditioning logic unit; and a second counter to increment in response to a second event signal delivered by the event conditioning logic unit, the second event signal in response to the comparator output indicating that the first counter value matches the data register value.

8. The apparatus of claim 7, the event conditioning logic unit to further receive an inverted version of the queue not empty signal.

9. The apparatus of claim 8, the event conditioning logic including programmable functions to allow a variety of combinations of the queue enter, queue exit, queue not empty, queue empty, and comparator output signals to serve as increment or decrement events.

10. The apparatus of claim 9, further comprising a block of registers including a command register and a status register.

11. The apparatus of claim 7, the first increment event signal issued in response to the assertion of the queue not empty signal.

12. The apparatus of claim 7, the first decrement event signal issued in response to the assertion of the queue exit signal.

13. The apparatus of claim 7, the data register programmable with a threshold level value.

14. A system, comprising:

a processor; and a system logic device coupled to the processor, the system logic device including a queue, a programmable event conditioning logic unit to receive a queue enter signal, a queue exit signal, and a queue not empty signal from the queue, the queue enter signal to be asserted in response to an entry entering the queue, the queue exit signal to be asserted in response to an entry exiting the queue, and the queue not empty signal to indicate that the queue contains at least one entry, and a first counter to increment in response to first increment event signal delivered by the event conditioning logic unit, the first counter to decrement in response to a first decrement event signal delivered by the event conditioning logic unit;

a second counter to increment in response to a second increment event signal delivered by the event conditioning logic unit, the second counter to decrement in response to a second decrement event signal delivered by the event conditioning logic unit, wherein assertion of at least one of the second increment event signal and the second decrement event signal is based on a value of the first counter.

15. The system of claim 14, the event conditioning logic unit to further receive an inverted version of the queue not empty signal.

16. The system of claim 15, further comprising a data register coupled to the first counter.

17. The system of claim 16, the system logic device further including a comparator including a first input, a second input, and an output, the first input coupled to the data register, the second input coupled to the first counter, and the output provided to the event conditioning logic unit.

18. The system of claim 17, the event conditioning logic including programmable functions to allow a variety of combinations of the queue enter, queue exit, queue not empty, queue empty, and comparator output signals to serve as increment or decrement events.

19. The system of claim 18, the system logic device further including a block of registers including a command register and a status register.

20. A method, comprising:

delivering a queue enter signal, a queue exit signal, and a queue not empty signal to a programmable event conditioning logic unit, the queue enter signal to be asserted in response to an entry entering a queue, the queue exit signal to be asserted in response to an entry exiting a queue, and the queue not empty signal to indicate that queue contains at least one entry;

asserting a first decrement event signal in response to an occurrence of a first programmable combination of the queue enter signal, the queue exit signal, and the queue not empty signal;

incrementing a first counter in response to the assertion of the first increment event signal;

asserting a first increment event signal in response to an occurrence of a second programmable combination of the queue enter signal, the queue exit signal, and the queue not empty signal;

decrementing the first counter in response to the assertion of the first decrement event signal;

asserting a second event signal; and incrementing a second counter in response to the assertion of the second event signal, the second event signal asserted in response to the first counter matching a threshold value.

21. The method of claim 20, further comprising storing the first counter value in a data register.

22. The method of claim 20, further comprising comparing the first counter value with a data register value, the data register value equal to the threshold value.

* * * * *